United States Patent [19]
Attfield

[11] Patent Number: 5,200,748
[45] Date of Patent: Apr. 6, 1993

[54] PATH GUIDANCE INDICATION APPARATUS FOR VEHICLES OR CRAFT

[76] Inventor: Ronald E. Attfield, The Belde, Church Lane, Bearstead, Nr. Maidstone, Kent, ME14 EF, England

[21] Appl. No.: 863,131

[22] Filed: Mar. 31, 1992

Related U.S. Application Data

[63] Continuation of Ser. No. 624,526, Dec. 7, 1990, abandoned, which is a continuation of Ser. No. 297,367, Jan. 17, 1989, abandoned.

[30] Foreign Application Priority Data

Jan. 14, 1988 [GB] United Kingdom ............... 8800759

[51] Int. Cl.$^5$ .............................................. B64F 1/18
[52] U.S. Cl. ...................................... 340/953; 340/955
[58] Field of Search ............... 340/953, 954, 955, 981, 340/982, 983; 342/33; 364/28; 73/178 T

[56] References Cited

U.S. PATENT DOCUMENTS

| | | | |
|---|---|---|---|
| 3,191,146 | 6/1965 | Mitchell | 340/955 |
| 3,447,129 | 5/1969 | Birmingham et al. | 340/955 |
| 3,885,876 | 5/1975 | Konopka | 340/955 |
| 4,170,767 | 10/1979 | Tanner | 340/955 |
| 4,241,604 | 12/1980 | Hergenrother | 340/949 |
| 4,532,512 | 7/1985 | Tanner | 340/955 |
| 4,707,696 | 11/1987 | Task et al. | 340/955 |

FOREIGN PATENT DOCUMENTS

| | | |
|---|---|---|
| 341577 | 1/1931 | United Kingdom . |
| 351572 | 7/1931 | United Kingdom . |
| 433715 | 8/1935 | United Kingdom . |
| 435053 | 9/1935 | United Kingdom . |
| 451145 | 7/1936 | United Kingdom . |
| 502974 | 3/1939 | United Kingdom . |
| 1292298 | 10/1972 | United Kingdom . |
| 1346852 | 2/1974 | United Kingdom . |
| 1371526 | 10/1974 | United Kingdom . |
| 1378431 | 12/1974 | United Kingdom . |
| 1597704 | 9/1981 | United Kingdom . |
| 2095012 | 9/1982 | United Kingdom . |

Primary Examiner—Jin F. Ng
Assistant Examiner—Brent A. Swarthout
Attorney, Agent, or Firm—Wegner, Cantor, Mueller & Player

[57] ABSTRACT

Apparatus for indicating to a vehicle or craft a desired path of travel, comprising a body including a plurality of systems adapted to emit electromagnetic radiation over a desired path, means partially to mask electromagnetic radiation emitted by at least some of the systems, and means to rotate the systems whereby the systems and mask means provide continuous and flashing electromagnetic signals for indicating a desired path for a vehicle or craft. The apparaus is particularly suitable for guiding helicopters during landing.

6 Claims, 1 Drawing Sheet

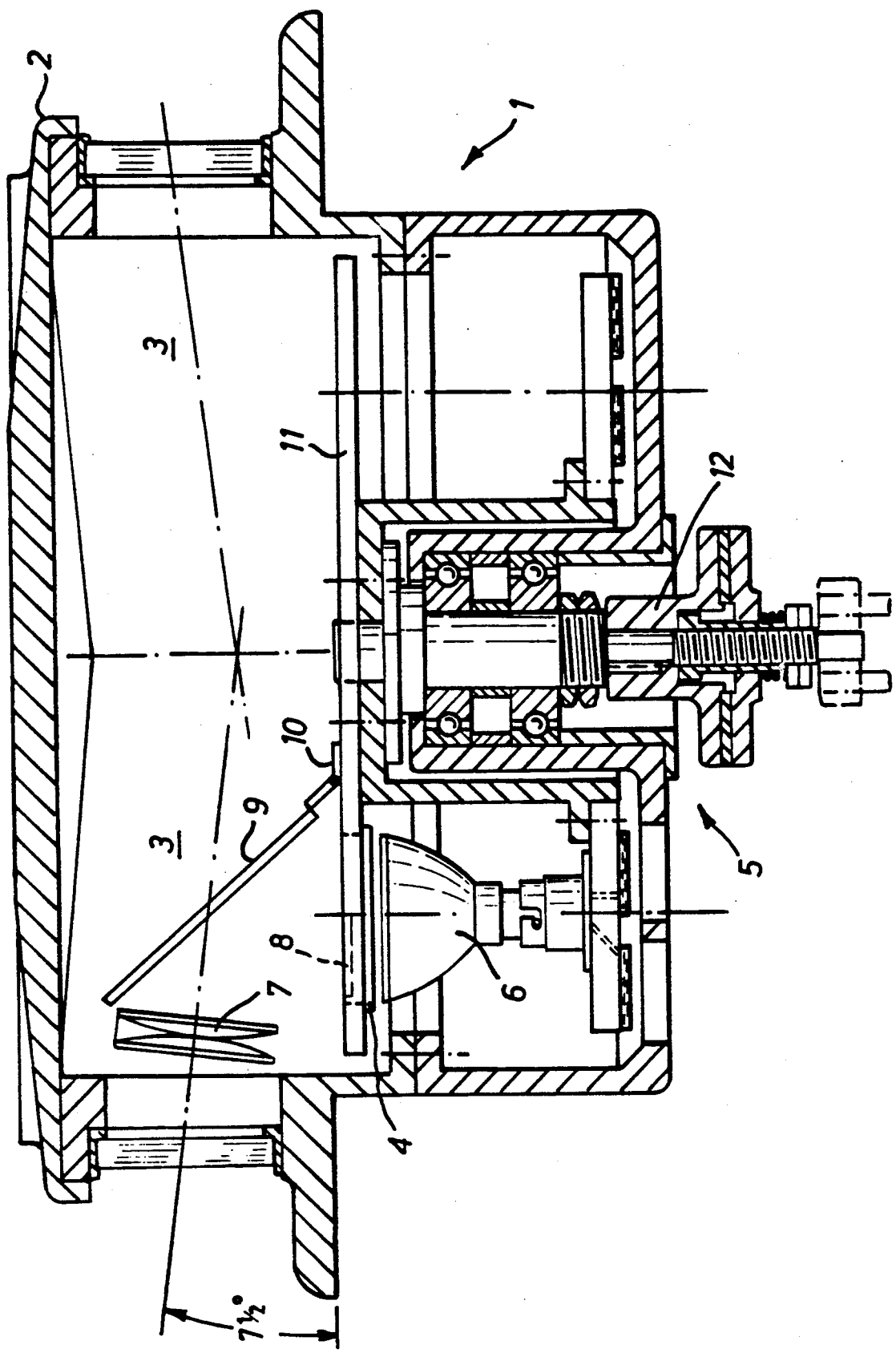

PATH GUIDANCE INDICATION APPARATUS FOR VEHICLES OR CRAFT

This application is a continuation of U.S. application Ser. No. 07/624,526, filed Dec. 7, 1990, now abandoned, which is a continuation of U.S. application Ser. No. 07/297,367, filed Jan. 17, 1989, now abandoned.

FIELD OF THE INVENTION

The invention relates to a path guidance indicator apparatus for vehicles or craft, particularly such apparatus as is useful for aiding an approaching aircraft, helicopter or any other guided object or craft.

BACKGROUND OF THE INVENTION

Known devices of this type are fixed uni-directional or capable of being rotated to a pre-determined position or positions at which the unit is again uni-directional and capable of being seen by an approaching craft only within a relatively narrow segment angle of a full circle.

SUMMARY OF THE INVENTION

It is an object of the invention to seek to mitigate this disadvantage of known devices.

According to one aspect of the invention there is provided apparatus for indicating to a vehicle or craft a desired path of travel, comprising a body including a plurality of systems adapted to emit electromagnetic radiation over a desired path, means partially to mask electromagnetic radiation emitted by at least some of the systems, and means to rotate the systems whereby the systems and mask means provide a continuous and flashing series of electromagnetic signals for indicating a desired path for a vehicle or craft.

Thus using the invention it is possible to provide an optical approach path indicator or system which is omni-directional, that is one which is capable of being seen by an approaching craft from any point around a full circle of 360° from the apparatus or if required a suitable mask or shutter may be fitted to mask off any portion of the full 360° continuous signals being emitted. The apparatus may be such as to be an in-line optical arrangement. This means the optical system will lay horizontally or orientated to the desired flight path angle. Using this layout no reflective mirror need be incorporated into the apparatus or system.

The apparatus may be used to align the approaching craft on to a defined angle of approach and will show warning signals should the craft be high, low and very high and very low from its correct defined approach angle.

The systems may comprise optical systems. This enables a visual path angle to be monitored, for example a flight path of a helicopter during landing.

The optical systems may each comprise a respective light source to illuminate the system. This provides for relative simplicity of construction and operation of the apparatus.

The optical systems may incorporate means to adjust the angle of emission of a light beam which indicates the desired path.

The adjustment means may comprise an adjustable, for example pivotable, mirror interposed in a light path from the light source to a lens means of the system. This provides a relatively simple and direct way of adjusting the path.

The optical systems may each comprise a coloured filter, preferably red, mounted to cover a part such as substantially half, of an optical aperture of the system with a projection lens at its focal point.

The edge of each filter may be curved, effectively to allow a curved beam of light to be projected into space. This provides a known width of red or white beam and therefore the angle of the light beam emitted can be ascertained. There may be an even number of optical systems each with a red filter and half of the systems may have masks fitted of such a narrow width as to allow a continuous signal and if required the other half of the systems may have masks fitted of a much wider width to allow the flashing signal emission. Typically there may be eight systems in toto though the number can be varied, for example 9-10 or 12.

The masks may suitably be positioned so that the center line of the masks has substantially the same radius as that of the filters. With this arrangement continuous light emission is possible of known angular width each side of the path angle.

The optical systems may be mounted on a mounting plate means coupled with a drive output means of the motor means.

The motor means may be an electric motor.

According to a second aspect of the invention there is provided a guidance system for vehicles or craft, comprising a plurality of spaced apparatus as hereinbefore defined.

According to a third aspect of the invention there is provided a guidance system for vehicles of craft, comprising a apparatus as hereinbefore defined, and a receptor system on board the vehicle or craft.

The on-board systems may comprise electronic or opto-electronic device(s) for providing a visual or other indication of a light path and/or means to adjust the attitude or position of the vehicle or craft so that a correct path is maintained.

Where the invention is used for a flying craft, it may be used during take-off or landing to provide a correct path.

Apparatus embodying the invention is hereinafter described, by way of example, in the accompanying drawing.

BRIEF DESCRIPTION OF THE DRAWING

The drawing shows a schematic side-elevational part sectional view of apparatus according to the invention.

DETAILED DESCRIPTION OF THE PREFERRED EMBODIMENTS

Referring to the drawing there is shown apparatus 1 for indicating to a vehicle or craft a desired, preferred or required path of travel, the apparatus 1 being in use remote or spaced from the vehicle or craft, comprising a body or housing 2 including a plurality of systems 3 adapted to emit electromagnetic radiation over a desired path, means 4 partially to mask electromagnetic radiation emitted by at least some of the systems 3, and means 5 to rotate the systems whereby the systems 3 and masks 4 provide a continuous and flashing series of electromagnetic signals for indicating a desired path for a vehicle or craft remote from the apparatus.

Only one of the systems O is shown on the drawing, as all are more or less identical. The systems 3 are in the embodiment optical systems comprising a light source 6 for each one, a lens 7 and aperture system including a coloured filter 8 and a mirror 9 in the light path between the light source and lens. The lens 7 and mirror 9 are set at 7½° to the horizontal, though this can be adjusted to any angle as the mirror angle is adjustable by adjusting an adjusting screw 10 at the base thereof pivots for the mirror being situated at the opposite end of the mirror. The effective mirror angle can be varied by passing light through a prism in front of the mirror 9. There is an optical mounting plate 11 on which all the systems 3 (of which there are eight in the embodiment) are mounted.

The motor (not shown) is an electrical motor connected by its output shaft 12 to the optical mounting plate 11 for rotating that plate 11, and hence the optical systems 3 in unison, horizontally.

The filter 8 is a red filter, and four of the systems 3 are masked by a suitable mask or stop 4. A typical apparatus embodying the invention comprises:

(a) An optical mounting plate 11;
(b) A number of optical systems 3 (typically 8 in this instance) a number of these being of different construction from the remainder and all of which act as collimators.
(c) A light source 6 to illuminate each optical system;
(d) A suitable coloured optical filter 8 (typically red in this instance);
(e) In some systems a mask or stop 4;
(f) A rotatable electric power pick-up system 5;
(g) A motor drive to give rotational movement to the optical systems affixed to the optical mounting plate;
(h) A housing and covers to incorporate the complete system (typically manufactured of metal); and
(i) Cylindrical or polygonal window for example a series of straight or flat windows typically 8 in number to allow the emission of optical signals (in this instance typically of heat resisting glass).

In use, the optical mounting plate 11 with the optical systems 3 fitted rotates in a horizontal plane with the optical systems 3 set to the required path angle. The drive motor will rotate the complete assembly at a speed to show a continuous series of signals when viewed from any point of a circle and within its azimuth range.

The coloured filters 8 (typically red as mentioned) are fitted and cover half an optical aperture with a projection lens set at its focal point, so as to produce a beam into space when illuminated by the light source. A number of systems set as shown about a center of rotation pointing outwards and set to a pre-set azimuth angle when rotated at a given speed will show as continuous red or white above or below the pre-set defined angle of approach. Of the eight optical systems 3 used, a number (usually 4) of these will have a mask or stop 4 fitted. The mask or stop 4 has an aperture of suitable size and configuration formed along and either side of the edge of the coloured filter, which edge is curved. The masks cause a series of signals when the apparatus is rotating. The signals are continuous and flashing. The motor rotates the apparatus at 180 rpm and the center part of the signal is continuous with the outer signal flashing. Thus when rotating at a given speed the effect is to project into space a flashing red and white signal to the azimuth extremities of the system and a continuous red and white signal each side of the defined pre-set angle. The positioning and width of the mask or stop aperture will determine, in conjunction with the focal length of the projection lens, the continuous beam width or angle.

With the apparatus placed upon or into a landing deck or platform or say an oil rig and the projected beams set to a given approach path angle, a craft such as a helicopter approaching from any direction and within its azimuth range, will intersect the beams at a known position if the altitude of the craft is known above the unit. A pilot of the helicopter or craft will firstly see a flashing red signal followed by a steady red signal. Once through the steady red signal, a steady white signal will be seen, followed by a flashing white signal. With the steady red and white signals of known height as shown by a chart of correct beam height, the pilot or controller of the approaching craft will be aware of being within a defined corridor either side of the given approach angle. As the craft approaches closer to the deck or platform any change in angle of approach will be apparent by a change of visible signal from continuous or steady white or red to "flashing" white or red, and correcting action can be taken.

It will be understood that apparatus embodying the invention may be used during daylight and in darkness, when a suitable system to dim the light output may be required. It will be understood too that the apparatus may be modified. Thus a modification could be the removal of the stops or masks, thus allowing continuous signals only to be seen, i.e. no flashing signals, or the red and white light could be green and white, or any required color.

The mirror may be "fixed" and final adjustment of the angle could be set by means of a rotatable optical wedge of plain, semi plain or curved or semi-curved form.

A further modification could be the introduction into the stop or mask aperture of a third color filter of a lesser width than that of the aperture. The color band could be typically green and would indicate the defined angle of approach within a tolerance determined by its width.

Furthermore, by using a system comprising two apparatus of the invention spaced apart, a guidance system can be provided. Moreover, if spaced vertically or horizontally the system can be used for flying craft, and horizontally for ships or for land vehicles. Craft may have on-board facilities for receiving signals from the system for control of the craft.

In every embodiment, the apparatus provides a "distance-off" indicator.

I claim:

1. Apparatus for indicating to a vehicle or craft a desired path of travel, comprising:
(a) a body;
(b) a plurality of optical systems housed in the body and adapted to emit a visual signal over a desired path, each said optical system defining an optical aperture and comprising a colored filter to cover only a portion of said optical aperture of the system;
(c) means for partially masking electromagnetic radiation emitted by some of the optical systems; and
(d) means for rotating the optical systems and mask means;
wherein said optical systems, mask means and rotation means cooperate to produce a series of omnidirectional visual signals over 360° of azimuth for indicating to a viewer of said signals a desired path of travel, said series comprising, from top to bottom as viewed, a flashing visual signal of a first color over a first viewing angle range and a steady non-flashing series of visual signals of said first color over a second viewing angle range, a steady non-flashing series of visual signals of a second color over a third viewing angle range, and a flashing visual signal of said second color over a fourth viewing angle range, each said viewing angle range delimiting a discrete corridor within or without a predetermined azimuth angle, and wherein the steady non-flashing first color over the second viewing angle range defines a desired flight path.

2. Apparatus as defined in claim 1, wherein the systems each comprise a respective light source to illuminate the respective system.

3. Apparatus as defined in claim 1, wherein the systems incorporate means to adjust the angle of emission of a light beam which indicates the desired path.

4. Apparatus as defined in claim 3, wherein the adjustment means comprises an adjustable mirror interposed in a light path from the light source to a lens means of the system.

5. Apparatus as defined in claim 1, wherein the edge of the filter crossing the optical aperture is curved.

6. A guidance system for vehicles or craft comprising a plurality of spaced apparatus as defined in claim 1.

* * * * *